United States Patent
Shen et al.

(10) Patent No.: US 12,388,749 B2
(45) Date of Patent: Aug. 12, 2025

(54) METHOD AND DEVICE FOR STORING AND FORWARDING CONTENT, ELECTRONIC APPARATUS AND STORAGE MEDIUM USING THE SAME

(71) Applicant: ZHEJIANG LAB, Zhejiang (CN)

(72) Inventors: Congqi Shen, Hangzhou (CN); Xingchang Guo, Hangzhou (CN); Hanguang Luo, Hangzhou (CN); Qi Xu, Hangzhou (CN); Tao Zou, Hangzhou (CN); Ruyun Zhang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 329 days.

(21) Appl. No.: 18/092,939

(22) Filed: Jan. 4, 2023

(65) Prior Publication Data
US 2023/0421500 A1 Dec. 28, 2023

(30) Foreign Application Priority Data
Jun. 24, 2022 (CN) .......................... 202210721168.6

(51) Int. Cl.
*H04L 45/7453* (2022.01)
*H04L 67/63* (2022.01)
*H04N 21/232* (2011.01)

(52) U.S. Cl.
CPC .......... *H04L 45/7453* (2013.01); *H04L 67/63* (2022.05); *H04N 21/232* (2013.01)

(58) Field of Classification Search
CPC ........ H04L 5/7453; H04L 67/63; H04L 12/54
See application file for complete search history.

(56) References Cited

U.S. PATENT DOCUMENTS

2015/0117449 A1* 4/2015 Mosko ................. H04L 45/306
370/392
2015/0117453 A1* 4/2015 Mosko ............. H04L 45/74591
370/392
(Continued)

FOREIGN PATENT DOCUMENTS

| CN | 103095724 A | 5/2013 |
| CN | 104333510 A | 2/2015 |

(Continued)

OTHER PUBLICATIONS

CN First Office Action(202210721168.6); Date of Mailing: Aug. 16, 2022.
The-implementation-of-CCN-routing-node-based-on-ethernet.

*Primary Examiner* — Jonathan A Bui
(74) *Attorney, Agent, or Firm* — Wiersch Law Group (57) ABSTRACT

A content store-and-forward method, apparatus, an electronic apparatus and a storage medium, the method comprising the following steps: receiving an interest packet in a named data network; forwarding the interest packet to a storage node, so that the storage node looks up the corresponding content, and packages the content into a data packet containing the hash value of the name identifier and the corresponding content; receiving the data packet forwarded by the storage node; forwarding the data packet to an interest packet port, wherein the interest packet port is a port that has once received the name identifier corresponding to the content in the data packet; forwarding another data packet to the storage node, so that the storage node parses the hash value and the content of the name identifier in the another data packet, and stores the hash value of the name identifier and the corresponding content.

6 Claims, 9 Drawing Sheets

(56) References Cited

U.S. PATENT DOCUMENTS

| | | | |
|---|---|---|---|
| 2016/0094553 A1* | 3/2016 | Azgin ................ | H04L 45/7453 713/154 |
| 2017/0048346 A1 | 2/2017 | Ravindran et al. | |
| 2019/0288874 A1 | 9/2019 | White et al. | |
| 2024/0179095 A1* | 5/2024 | Zheng ................ | H04L 45/245 |

FOREIGN PATENT DOCUMENTS

| CN | 105812462 A | 7/2016 |
|---|---|---|
| CN | 114257560 A | 3/2022 |

* cited by examiner

METHOD AND DEVICE FOR STORING AND FORWARDING CONTENT, ELECTRONIC APPARATUS AND STORAGE MEDIUM USING THE SAME

CROSS-REFERENCE TO RELATED APPLICATIONS

The present application claims priority to Chinese Patent Application No. 202210721168.6, filed on Jun. 24, 2022, the content of which is incorporated herein by reference in its entirety.

TECHNICAL FIELD

The present disclosure relates to the technical field of data/network transmission, in particular to a method and a device for storing and forwarding content, an electronic apparatus and a storage medium using the same.

BACKGROUND OF THE INVENTION

In the current Internet, Video On Demand (VOD) is an important network application. The traditional IP network is complicated and expensive for this kind of service deployment, so it cannot provide video content efficiently for users. A named data network, a novel architecture of the next generation Internet, supports caching and multipath transmission in the network, and can enable the efficient transmission of video content. Therefore, this requires the switch to achieve content storage and message forwarding at the same time.

In view of the above requirements, the current mainstream technologies can be divided into two categories: one is to use external terminal modules to store content; the second is to use additional storage modules on the switch to complete caching.

In the process of realizing the present disclosure, it is found that the prior art has at least the following problems.

The use of external terminals to store content will lead to a limited forwarding performance, increased hardware overhead and deployment difficulties, and it is easy to cause anomalies due to various factors, resulting in low reliability of content storage. In order to improve the forwarding performance of the switch, it is generally necessary to use a data plane development kit, which isolates the communication between the physical network card and the linux kernel protocol stack, ultimately resulting in the inability to simultaneously achieve high performance forwarding and reliable content storage on the switch.

SUMMARY OF THE INVENTION

The embodiment of the present disclosure aims to provide a content store-and-forward method and apparatus, an electronic apparatus and a storage medium, so as to solve the technical problem that the excellent forwarding performance cannot be compatible with outstanding storage performance in a named data network.

According to a first aspect of the embodiment of the present disclosure, there is provided a method for storing and forwarding content applied to a programmable switch, the method including:

Receiving an interest packet in a named data network. In an embodiment, the interest packet contains a hash value of a name identifier.

Forwarding the interest packet to a storage node, so that the storage node looks up corresponding content according to the hash value of the name identifier in the interest packet, and encapsulates the content into a data packet. In an embodiment, the data packet contains the hash value of the name identifier and the corresponding content.

Receiving the data packet forwarded by the storage node.

Forwarding the data packet to an interest packet port. In an embodiment, the interest packet port is a port that has once received the name identifier corresponding to the content in the data packet.

Forwarding another data packet from other programmable switches to the storage node, so that the storage node parses the hash value and the content of the name identifier in the another data packet, and stores the hash value of the name identifier and the corresponding content.

In an embodiment, the method further includes, upon receiving the interest packet in the named data network:

Determining whether the interest packet has been previously received.

If yes, executing the step of forwarding the interest packet to the storage node.

If not, forwarding to other programmable switches to wait for other programmable switches in the network to send a data packet in response to the interest packet.

According to a second aspect of the embodiment of the present disclosure, there is provided a content store-and-forward method applied to a programmable switch, including:

Receiving an interest packet forwarded by a programmable switch. In an embodiment, the interest packet comes from a named data network and contains a hash value of a name identifier.

Looking up corresponding content according to the hash value of the name identifier in the interest packet.

Encapsulating the content into a data packet and forwarding the data packet to the programmable switch, so that the programmable switch forwards the data packet to an interest packet port. In an embodiment, the data packet contains the hash value of the name identifier and the corresponding content, and the interest packet port is the port that has once received the name identifier corresponding to the content in the data packet.

Receiving another data packet forwarded by the programmable switch from other programmable switches.

Parsing the hash value and the content of the name identifier in another data packet.

Storing the hash value of the name identifier and the corresponding content.

In an embodiment, the step of storing the hash value of the name identifier and the corresponding content includes:

Calculating a number of segments to be divided for storing the content according to a segment size preset by the storage node.

Dividing the content in turn according to the number of segments to form each segment of content to be stored.

Calculating the hash value of each segment of content by using a preset hash function.

Determining whether the hash value of each segment of content collides with the stored hash value of each segment of content, and if a hash collision occurs, recalculating the hash value of each segment of content using a candidate hash function to until no collision occurs.

Storing the content in segments, respectively recording the hash value of the name identifier, the number of content segments, the current segment number, the hash value of the content of the current segment and corresponding content data segments, thereby completing the content storage.

According to a third aspect of the embodiment of the present disclosure, there is provided a device for storing and forwarding content applied to a programmable switch, including:

A first receiving module configured to receive an interest packet in a named data network. In an embodiment, the interest packet contains a hash value of a name identifier.

A first forwarding module configured to forward the interest packet to a storage node, so that the storage node looks up corresponding content according to the hash value of the name identifier in the interest packet, and encapsulates the content into a data packet. In an embodiment, the data packet contains the hash value of the name identifier and the corresponding content.

A second receiving module configured to receive the data packet forwarded by the storage node.

A second forwarding module configured to forward the data packet to an interest packet port. In an embodiment, the interest packet port is a port that has once received the name identifier corresponding to the content in the data packet.

A third forwarding module configured to forward another data packet from other programmable switches to the storage node, so that the storage node parses the hash value of the name identifier and the content in the another data packet, and stores the hash value of the name identifier and the corresponding content.

In an embodiment, the device further includes, after the first receiving module:

A determining module configured to determine whether the interest packet has been previously received.

A first execution module configured to, if yes, execute the step of forwarding the interest packet to the storage node.

A second execution module configured to, if not, forwarding to other programmable switches to wait for other programmable switches in the network to send a data packet in response to the interest packet.

According to a fourth aspect of the embodiment of the present disclosure, there is provided a device for storing and forwarding content applied to a programmable switch, including:

A third receiving module configured to receive an interest packet forwarded by a programmable switch. In an embodiment, the interest packet is from a named data network, and the interest packet contains a hash value of a name identifier.

A look-up module configured to look up the corresponding content according to the hash value of the name identifier in the interest packet.

A fourth forwarding module configured to encapsulate the content into a data packet and forward the data packet to the programmable switch, so that the programmable switch forwards the data packet to an interest packet port. In an embodiment, the data packet contains the hash value of the name identifier and the corresponding content, and the interest packet port is the port that has once received the name identifier corresponding to the content in the data packet.

A fourth receiving module configured to receive another data packet forwarded by the programmable switch from other programmable switches.

A parsing module configured to parse the hash value of the name identifier and the content in another data packet.

A storage module configured to store the hash value of the name identifier and the corresponding content.

In an embodiment, the storage module includes:

A first calculation module configured to calculate a number of segments to be divided for storing the content according to a segment size preset by a storage node.

A dividing module configured to divide the content in turn according to the number of segments to form each segment of content to be stored.

A second calculation module configured to calculate the hash value of each segment of content by using a preset hash function.

A determining module configured to determine whether the hash value of each segment of content collides with the stored hash value of each segment of content, and if a hash collision occurs, recalculate the hash value of each segment of content using a candidate hash function until no collision occurs.

A storage sub-module configured to store the content in segments, and respectively record the hash value of the name identifier, the number of content segments, the current segment number, the hash value of the content of the current segment and corresponding content data segments, so as to complete the content storage.

According to a fifth aspect of the embodiment of the present disclosure, there is provided an electronic apparatus including:

one or more processors;

a memory for storing one or more programs;

when the one or more programs are executed by the one or more processors, the one or more processors implements the method according to the first or second aspect.

According to a sixth aspect of the embodiment of the present disclosure, there is provided a computer-readable storage medium on which a computer instruction is stored. In an embodiment, the instruction, when executed by a processor, implements the method according to the first or second aspect.

The technical solution provided by the embodiment of the present disclosure can include the following beneficial effects:

It can be seen from the above embodiments that the programmable switch and the storage node can receive, parse, encapsulate and send interest packets, required data packets and store related content, and can directly send a data packet in response to the content requested by the interest packets from the switch, thus realizing the integration of storage and forwarding on the programmable switch, solving the problem of incompatible forwarding performance and storage performance in named data network from the point of view of integration of forwarding and storage, and has strong practical significance for accelerating the deployment of the named data network in the actual network.

It should be understood that the above general description and the following detailed description are exemplary and explanatory only, and are not intended to limit the present disclosure.

BRIEF DESCRIPTION OF DRAWINGS

The accompanying drawings, which are incorporated in and constitute a part of this specification, illustrate embodiments consistent with the present disclosure and together with the description, serve to explain the principles of the application.

DETAILED DESCRIPTION OF THE INVENTION

Exemplary embodiments will be described in detail herein, examples of which are shown in the accompanying drawings. Where the following description refers to the drawings, unless otherwise indicated, the same numbers in different drawings indicate the same or similar elements. The embodiments described in the following exemplary embodiments do not represent all the embodiments consistent with this application. On the contrary, they are only examples of apparatuses and methods consistent with some aspects of this application as detailed in the appended claims.

The terminology used in this application is for the purpose of describing specific embodiments only, and is not intended to limit this application. The singular forms of "a", "an" and "the" used in this application and the appended claims are also intended to include the plural forms as well, unless the context clearly indicates otherwise. It will also be understood that the term "and/or" as used herein refers to and encompasses any and all possible combinations of one or more of the associated listed items.

It should be understood that although the terms first, second, third, etc. may be used in this application to describe various information, these information should not be limited to these terms. These terms are only used to distinguish the same type of information from each other. For example, first information may also be referred to as second information, and, similarly, second information may also be referred to as first information, without departing from the scope of the present disclosure. The word "if as used herein may be interpreted as" upon "or" when "or" in response to determining" depending on the context.

Figure 1:
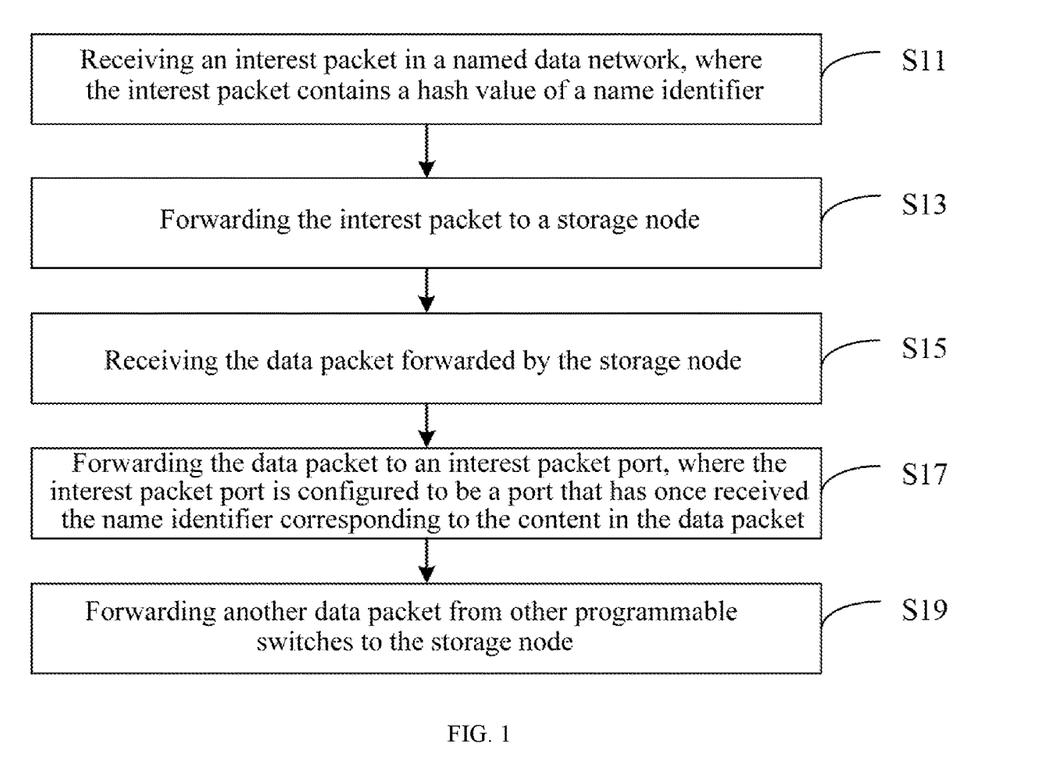
FIG. 1 is a flowchart of a method for storing and forwarding content according to an exemplary embodiment.

FIG. 1 is a flowchart of a method for storing and forwarding content according to an exemplary embodiment. As shown in FIG. 1, the method is applied to a programmable switch and may include the following steps:

S11, receiving an interest packet in a named data network, in an embodiment, the interest packet contains a hash value of a name identifier;

S13, forwarding the interest packet to a storage node, so that the storage node looks up corresponding content according to the hash value of the name identifier in the interest packet, and encapsulates the content into a data packet, in an embodiment, the data packet contains the hash value of the name identifier and the corresponding content;

S15, receiving the data packet forwarded by the storage node;

S17, forwarding the data packet to an interest packet port, in an embodiment, the interest packet port is a port that has once received the name identifier corresponding to the content in the data packet; and S19, forwarding another data packet from other programmable switches to the storage node, so that the storage node parses the hash value and the content of the name identifier in another data packet, and stores the hash value of the name identifier and the corresponding content.

It can be seen from the above embodiments that the programmable switch and the storage node can receive and parse, encapsulate and send interest packets, required data packets and store related content, and can directly send the data packets in response to the requested content in the interest packets from the switch, thus realizing the integration of storage and forwarding on the programmable switch. The programmable switch is used to realize the high-performance forwarding of messages in the named data network, solving the problem of incompatible forwarding performance and storage performance in named data network from the point of view of integration of forwarding and storage, and has strong practical significance for accelerating the deployment of the named data network in the actual network.

In the specific implementation of step S11, the programmable switch receives an interest packet in a named data network, in an embodiment, the interest packet contains a hash value of a name identifier;

In an embodiment, the interest packet is sent by a terminal in the network, and the message structure conforms to the format specified in the named data network protocol stack.

Upon receiving the interest packet, the programmable switch parses the message according to the programmed parsing process, and extracts the hash value of the name identifier in the message. For example, if the name identifier in the interest packet is /snt/sedan/state, 0x7ede is extracted from the message.

In this step, the hash value of the name identifier of the interest packet in the named data network is extracted and is used to forward the interest packet or find out whether the corresponding content already exists on the storage node.

In the specific implementation of step S13, the programmable switch forwards the interest packet to the storage node, so that the storage node looks up the corresponding content according to the hash value of the name identifier in the interest packet, and encapsulates the content into a data packet, in an embodiment, the data packet contains the hash value of the name identifier and the corresponding content;

In an embodiment, the storage node can support the named data network protocol stack, parse and package interest packets and data packets according to the format specified by the protocol stack, calculate corresponding hash values according to the content and reduce hash collisions.

Using the kernel NIC interface technology, the programmable switch can establish communication with the storage node and forward the interest packet to the storage node, so that the storage node can parse the interest packet and obtain the hash value of the name identifier in the interest packet. According to the hash value of the name identifier, the storage node searches for the hash value of the corresponding content and further finds the content. The storage node encapsulates the content into a data packet according to the named data network protocol stack.

This step is used to look up the content on the storage node, which avoids the continued forwarding of interest packets, and can directly send a data packet in response the corresponding content on the storage node to the port requesting the interest packets, thus realizing the integration of storage and forwarding.

In the specific implementation of step S15, the programmable switch receives the data packet forwarded by the storage node;

In an embodiment, the data packet contains the hash value of the name identifier and the corresponding content. The programmable switch receives the data packet by using the communication network port between the programmable switch and the storage node established based on the kernel NIC interface technology.

In this step, the advantages of the named data network are realized, the interest packets are prevented from being forwarded continuously, and the corresponding content is directly obtained from the storage node, thus saving the network bandwidth.

In the specific implementation of step S17, the programmable switch forwards the data packet to the interest packet port, which is the port that has once received the name identifier corresponding to the content in the data packet;

In an embodiment, the programmable switch obtains the interest packet port through another internal register variable, and forwards the data packet to the interest packet port.

This step achieves the advantages of the named data network, and makes use of the storage node of programmable switch to directly send a data packet in response to interest packets, thus realizing the integration of storage and forwarding, and saving network bandwidth at the same time.

In the specific implementation of step S19, the programmable switch forwards another data packet to the storage node, so that the storage node parses the hash value and content of the name identifier in the another data packet, and stores the hash value of the name identifier and the corresponding content.

In an embodiment, since there are multiple programmable switch nodes in the actual network, the programmable switch may receive data packets from other programmable switches. The programmable switch forwards another data packet to the storage node, and the storage node parses the corresponding data packet to obtain the hash value of the name identifier and the corresponding content. The storage node searches whether the hash value of the name identifier has been stored; if yes, the another data packet is discarded; if not, the hash value of the name identifier and the corresponding content are stored.

This step continuously supplements the content stored on the storage node, and the interest packet can be can directly responded upon receiving the corresponding interest packet, thus realizing the integration of forwarding and storage, giving full play to the advantages of the named data network and saving the network bandwidth.

Figure 2:
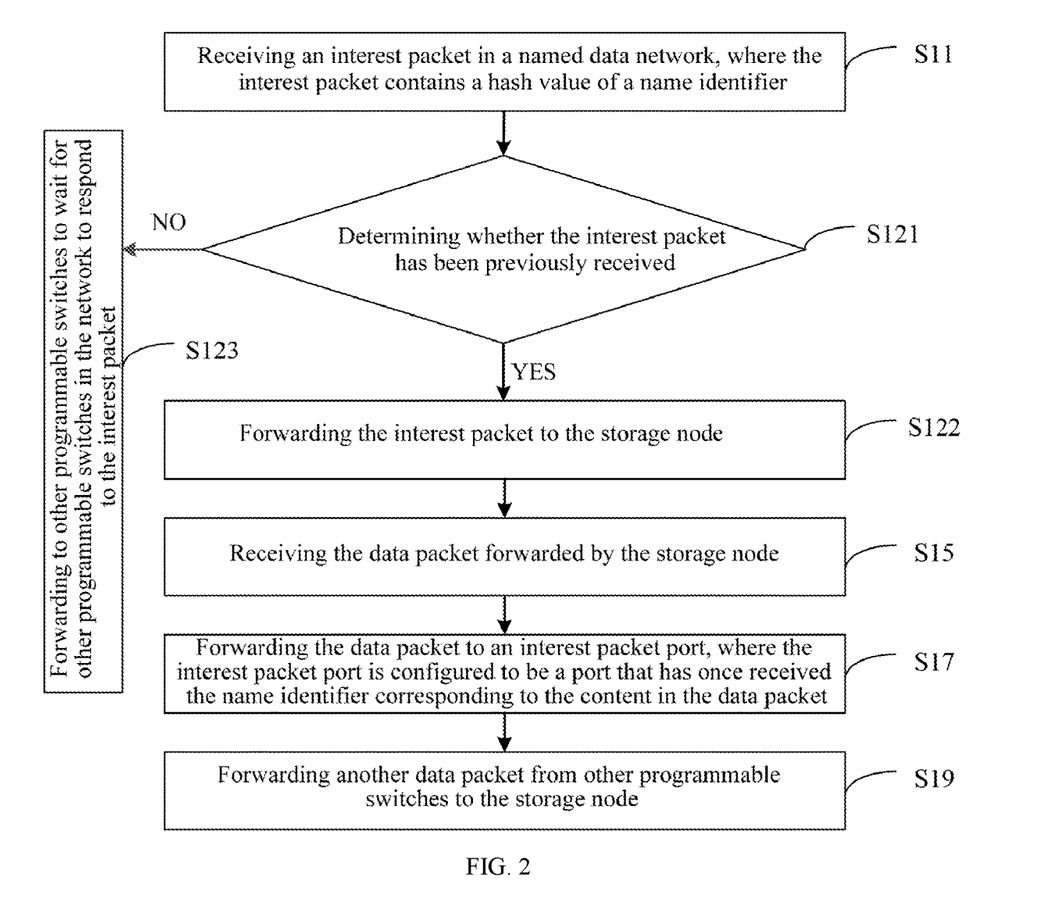
FIG. 2 is a flowchart of another method for storing and forwarding content according to an exemplary embodiment.

In order to find out whether the interest packet can be directly responded by the programmable switch, referring to FIG. 2, after step S11, the method may further include:

S121, determining whether the interest packet has been previously received; in an embodiment, the programmable switch determines whether the interest packet has been previously received according to the variable value stored in the internal register; and S122, if yes, executing the step of forwarding the interest packet to the storage node;

S123, if not, forwarding to other programmable switches to wait for other programmable switches in the network to send a data packet in response to the interest packet.

In an embodiment, if yes, the communication network port between the programmable switch and the storage node established based on the kernel network card interface technology is used to send the data packet to the storage node, and the storage node returns the data packet to complete the response of the interest packet; If not, it means that the programmable switch does not store the corresponding content, and can only forward it to other programmable switches to wait for other programmable switches in the network to send a data packet in response to the interest packet.

Figure 3:
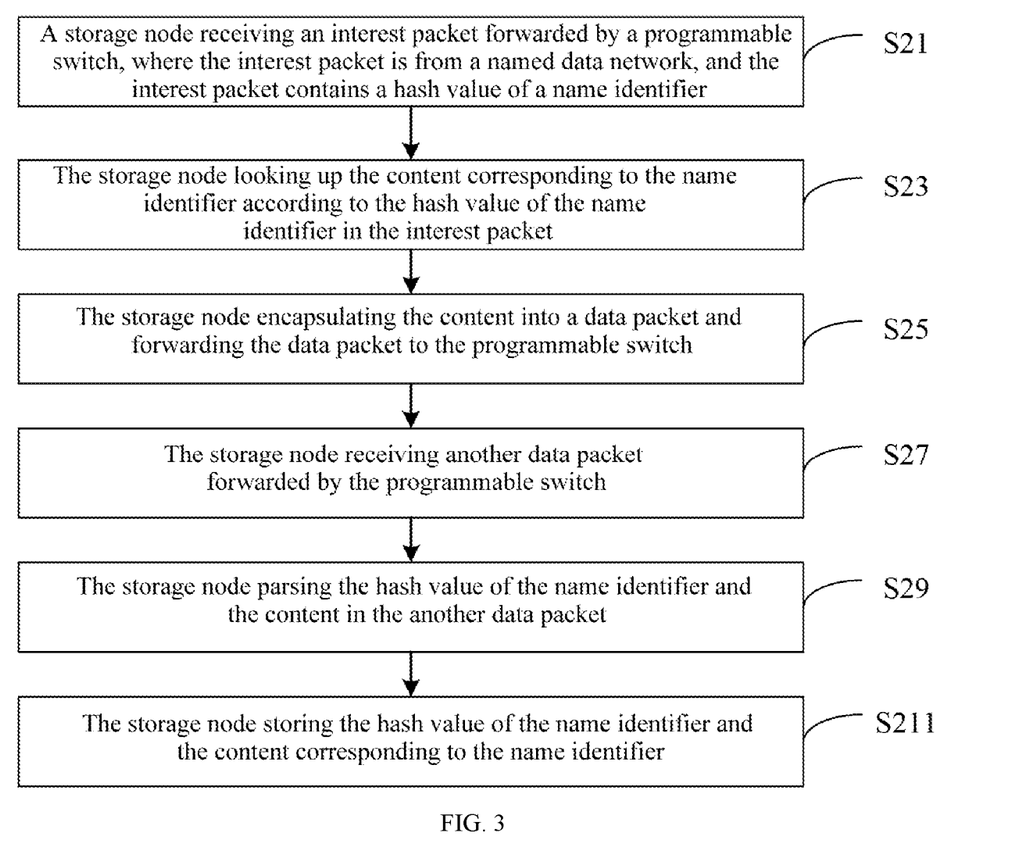
FIG. 3 is a flowchart of another method for storing and forwarding content according to an exemplary embodiment.

FIG. 3 is a flowchart of a method for storing and forwarding content according to an exemplary embodiment. As shown in FIG. 3, the method is applied to a storage node and may include the following steps:

S21, a storage node receiving an interest packet forwarded by a programmable switch, in an embodiment, the interest packet is from a named data network, and the interest packet contains a hash value of a name identifier.

S23, the storage node looking up the corresponding content according to the hash value of the name identifier in the interest packet.

S25, the storage node encapsulating the content into a data packet and forwarding it to the programmable switch, so that the programmable switch forwards the data packet to an interest packet port, in an embodiment, the data packet includes the hash value of the name identifier and the corresponding content, and the interest packet port is the port that has once received the name identifier corresponding to the content in the data packet.

S27, the storage node receiving another data packet forwarded by the programmable switch.

S29, the storage node parsing the hash value of the name identifier and the content in the another data packet.

S211, the storage node storing the hash value of the name identifier and the corresponding content.

It can be seen from the above embodiments that the programmable switch and the storage node can receive, parse, package and send interest packets, required data packets and store related content, and can directly send a data packet in response to the requested content in the interest packets from the switch, thus realizing the integration of storage and forwarding on the programmable switch. The programmable switch is used to realize the high-performance forwarding of messages in the named data network, solving the problem of incompatible forwarding performance and storage performance in named data network from the point of view of integration of forwarding and storage, which has strong practical significance for accelerating the deployment of the named data network in the actual network.

Please refer to step S11-step S19 for the detailed description of step S21-step S29, which will not be repeated herein.

Figure 4:
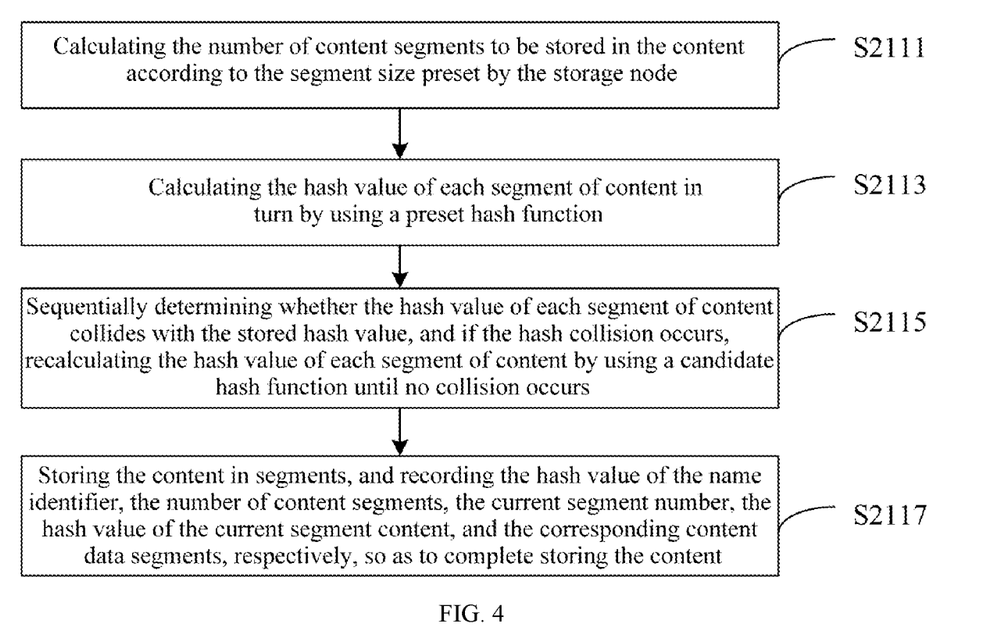
FIG. 4 is a flowchart of step S211 according to an exemplary embodiment.

In the specific implementation of step S211, the storage node stores the hash value of the name identifier and the corresponding content. Referring to FIG. 4, it may include the following sub-steps:

S2111, calculating the number of content segments to be stored in the content according to the segment size preset by the storage node.

In an embodiment, due to factors such as hardware apparatuses, it is impossible to directly store the content, so it is necessary to store the content in segments. The storage node calculates the number of segments needed to store the content according to the size of the content in the parsed data packet, in an embodiment, the size of each segment of content is preset and determined by the storage node. This step will subsequently assist in the completion of content storage.

S2113, calculating the hash value of each segment of content in turn using a preset hash function.

In an embodiment, the hash function is a common method in storage, which is used to calculate content as a string of binary data; for example, the hash value can be used as the address of content storage; by using a preset hash function in the storage node, each segment of content is used as the function input in turn, and the output value is obtained as the hash value of each segment of content; this step uses a hash function to reduce storage and search overhead.

S2115, sequentially determining whether the hash value of each segment of content collides with the stored hash value, and if the hash collision occurs, recalculating the hash value of each segment of content by using a candidate hash function until no collision occurs.

In an embodiment, hash functions are prone to hash collisions, so it is necessary to minimize hash collisions; whether the hash value of each segment of content collides with the stored hash value is determined in turn, and if the hash collision occurs, other candidate hash functions are used to recalculate the hash value of each segment of content until no collision occurs; this step is used to minimize hash collisions.

S2117, storing the content in segments, and respectively recording the hash value of the name identifier, the number of content segments, the current segment number, the hash value of the current segment content, and the corresponding content data segments, thereby completing the content storage.

In an embodiment, the storage node records the hash value of the name identifier, the number of content segments, the current segment number, the hash value of the current segment content, and the corresponding content data segments in turn to complete the content storage. This step is used to store the content, so as to facilitate the subsequent search of the content, and directly send a data packet in response to the interest packet from the storage node, thus realizing the integration of storage and forwarding.

In this application, the programmable switch is used to realize the high-performance forwarding of messages in the named data network, and the kernel network card interface technology can be used to realize the communication between the physical network card of the programmable switch and the kernel protocol stack, so that the programmable switch and the storage node can communicate interactively, so that the storage node can receive interest packets and data packets, update storage according to the content of the data packets, and send data packets according to the request of the interest packet content, solving the problem of incompatible forwarding performance and storage performance in named data network from the point of view of integration of forwarding and storage, which has strong practical significance for accelerating the deployment of the named data network in the actual network.

Corresponding to the aforementioned embodiment of the content store-and-forward method, the application also provides an embodiment of the content store-and-forward apparatus.

Figure 5:
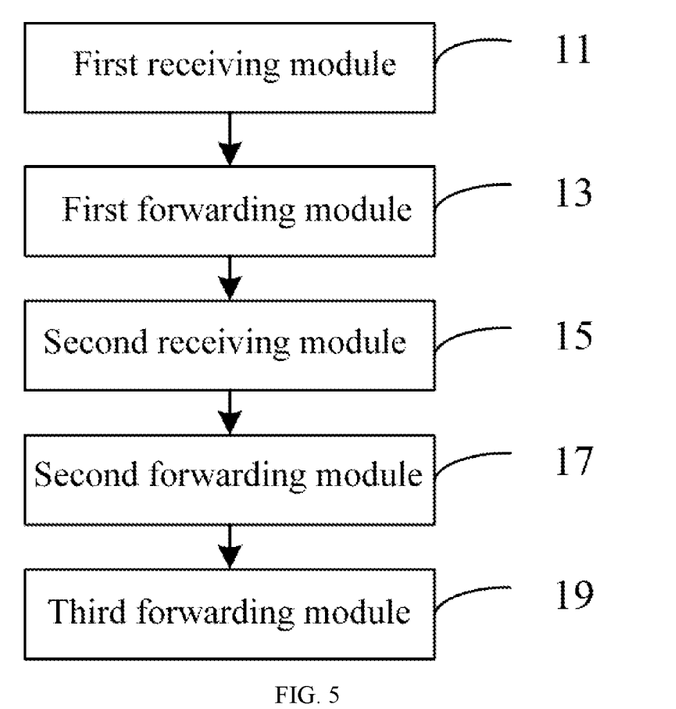
FIG. 5 is a block diagram of a device for storing and forwarding content according to an exemplary embodiment.

FIG. 5 is a block diagram of a device for storing and forwarding content according to an exemplary embodiment. Referring to FIG. 5, the device applied to a programmable switch includes:

a first receiving module 11 configured to receive an interest packet in a named data network, in an embodiment, the interest packet contains a hash value of a name identifier;

a first forwarding module 13 configured to forward the interest packet to a storage node, so that the storage node looks up corresponding content according to the hash value of the name identifier in the interest packet, and encapsulates the content into a data packet, in an embodiment, the data packet contains the hash value of the name identifier and the corresponding content;

a second receiving module 15 configured to receive the data packet forwarded by the storage node;

a second forwarding module 17 configured to forward the data packet to an interest packet port, in an embodiment, the interest packet port is a port that has once received the name identifier corresponding to the content in the data packet; and a third forwarding module 19 configured to forward another data packet from other programmable switches to the storage node, so that the storage node parses the hash value of the name identifier and the content in the another data packet, and stores the hash value of the name identifier and the corresponding content.

Figure 6:
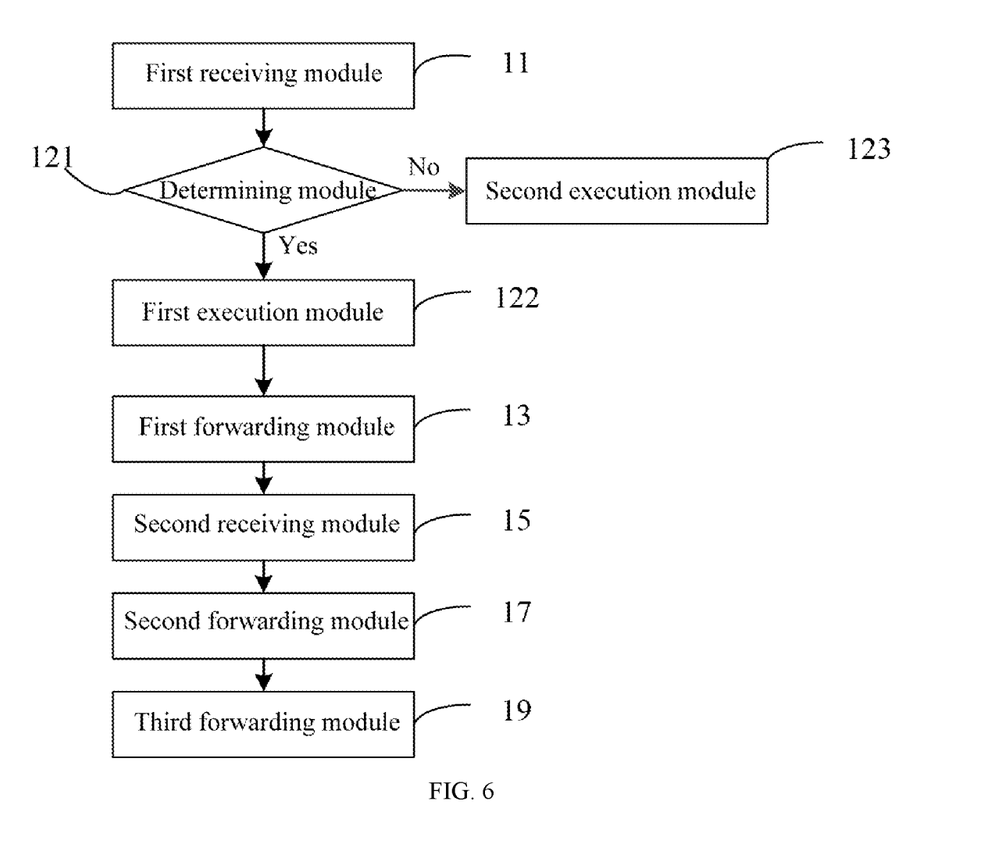
FIG. 6 is a block diagram of another device for storing and forwarding content according to an exemplary embodiment.

Referring to FIG. 6, after the first receiving module 11, the device further includes: a determining module 121 configured to determine whether the interest packet has been previously received;

a first execution module 122 configured to, if yes, execute the step of forwarding the interest packet to the storage node; and a second execution module 123 configured to, if not, forwarding to other programmable switches to wait for other programmable switches in the network to send a data packet in response to the interest packet.

Figure 7:
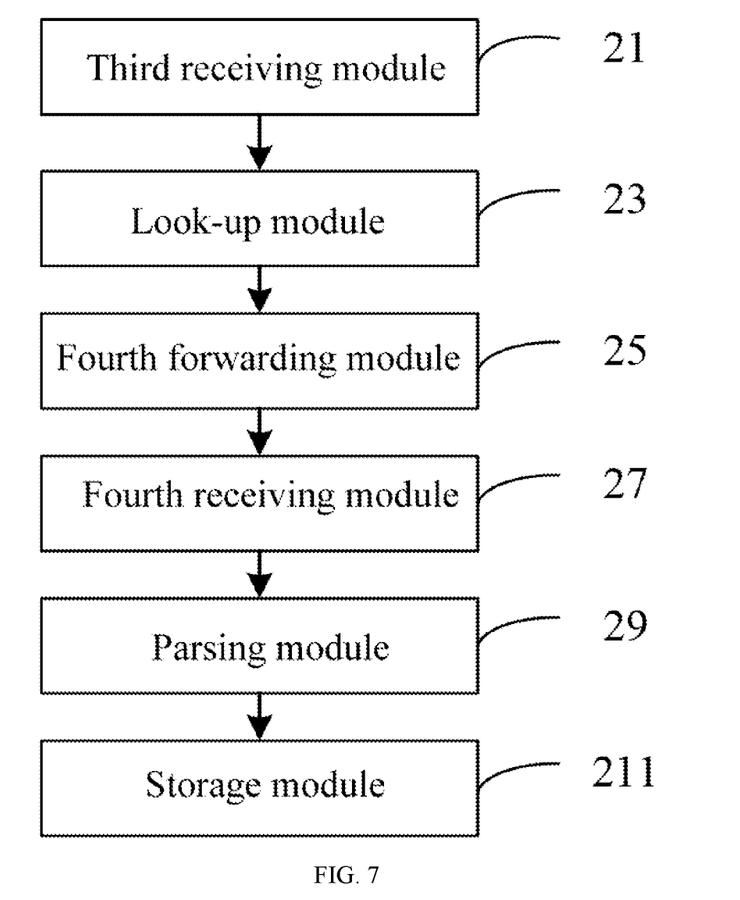
FIG. 7 is a block diagram of another device for storing and forwarding content according to an exemplary embodiment.

FIG. 7 is a block diagram of a device for storing and forwarding content according to an exemplary embodiment. Referring to FIG. 7, the device applied to a storage node includes:

a third receiving module 21 configured to receive an interest packet forwarded by a programmable switch, in an embodiment, the interest packet is from a named data network, and the interest packet contains a hash value of a name identifier; a look-up module 23 configured to look up the corresponding content according to the hash value of the name identifier in the interest packet;

a fourth forwarding module 25 configured to encapsulate the content into a data packet and forward the data packet to the programmable switch, so that the programmable switch forwards the data packet to an interest packet port, in an embodiment, the data packet contains the hash value of the name identifier and the corresponding content, and the interest packet port is the port that has once received the name identifier corresponding to the content in the data packet;

a fourth receiving module 27 configured to receive another data packet forwarded by the programmable switch from other programmable switches;

a parsing module 29 configured to parse the hash value of the name identifier and the content in the another data packet; and a storage module 211 configured to store the hash value of the name identifier and the corresponding content.

Figure 8:
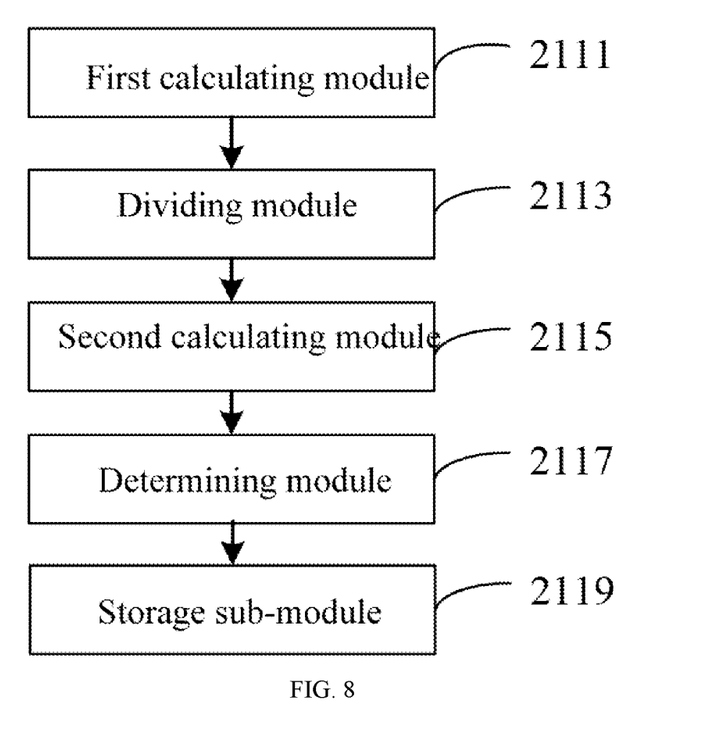
FIG. 8 is a block diagram of a storage module 211 according to an exemplary embodiment.

Referring to FIG. 8, the storage module 211 includes:

a first calculation module 2111 configured to calculate a number of segments to be divided for storing the content according to a segment size preset by a storage node;

a dividing module 2113 configured to divide the content in turn according to the number of segments to form each segment of content to be stored;

a second calculation module 2115 configured to calculate the hash value of each segment of content by using a preset hash function;

a determining module 2117 configured to determine whether the hash value of each segment of content collides with the stored hash value of each segment of content, and if a hash collision occurs, recalculate the hash value of each segment of content using a candidate hash function until no collision occurs; and a storage sub-module 2119 configured to store the content in segments, and respectively record the hash value of the name identifier, the number of content segments, the current segment number, the hash value of the content of the current segment and corresponding content data segments, so as to complete the content storage.

With regard to the apparatus in the above embodiment, the specific way in which each module performs operations has been described in detail in the embodiment of the method, and will not be explained in detail here.

As for the apparatus embodiment, it basically corresponds to the method embodiment, so please refer to the partial description of the method embodiment. The above-described apparatus embodiments are only schematic, in which the units described as separate components may or may not be physically separated, and the components displayed as units may or may not be physical units, that is, they may be located in one place or distributed over multiple network units. Some or all of the modules can be selected according to the actual needs to achieve the purpose of the application solution. Those skilled in the art can understand and implement it without creative labor.

Figure 9:
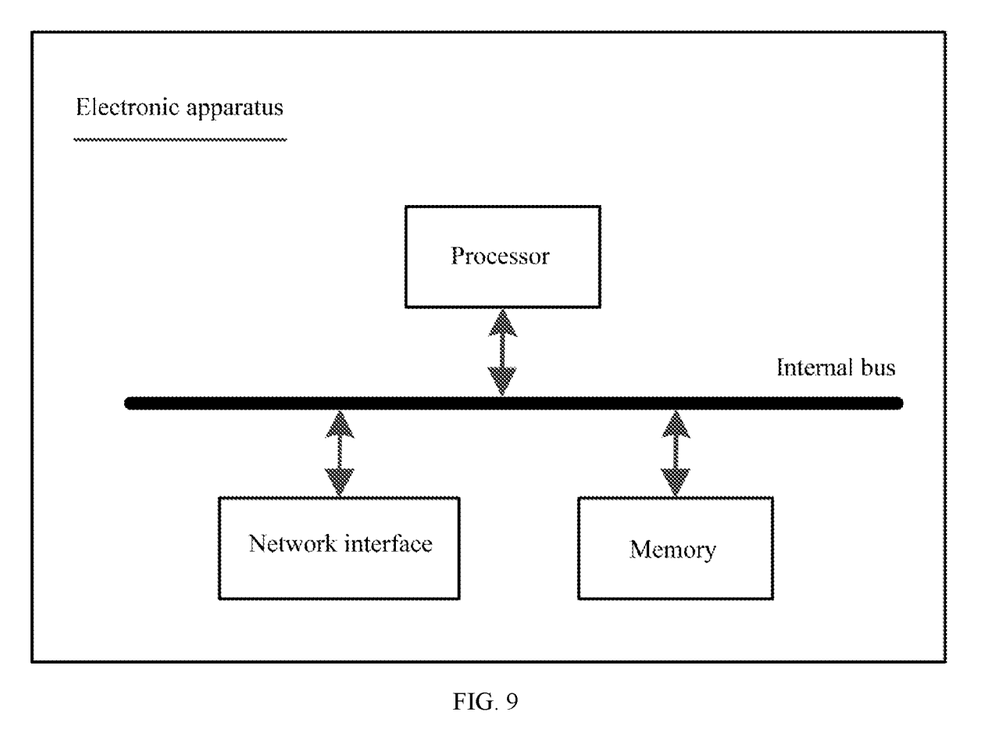
FIG. 9 is a structural diagram of an electronic apparatus according to an exemplary embodiment.

Accordingly, the application also provides an electronic apparatus, which includes one or more processors; a memory for storing one or more programs; when the one or more programs are executed by the one or more processors, the one or more processors are enabled to implement the content store-and-forward method as described above. As shown in FIG. 9, a hardware structure diagram of any apparatus with data processing capability provided by the embodiment of the present disclosure is shown. Except for the processor, memory and network interface shown in FIG. 9, any apparatus with data processing capability in the embodiment of the present disclosure can usually include other hardware according to the actual functions of any apparatus with data processing capability, which will not be repeated here.

Accordingly, the application also provides a computer-readable storage medium, on which computer instructions are stored, which when executed by a processor realize the content store-and-forward method as described above.

The computer-readable storage medium can be the internal storage unit of any apparatus with data processing capability as described in any of the previous embodiments, such as a hard disk or a memory. The computer-readable storage medium can also be an external storage apparatus of the wind turbine, such as a plug-in hard disk, a Smart Media Card (SMC), an SD card, a Flash Card and the like, provided on the apparatus. Furthermore, the computer-readable storage medium may also include both the internal storage unit of any apparatus with data processing capability and the external storage apparatus. The computer-readable storage medium is used to store the computer program and other programs and data required by any apparatus with data processing capability, and can also be used to temporarily store data that has been output or will be output.

Those skilled in the art will easily think of other embodiments of this application after considering the specification and practicing the contents disclosed herein. This application is intended to cover any variations, uses or adaptations of this application, which follow the general principles of this application and include common knowledge or common technical means in the technical field not disclosed in this application. The specification and examples are to be regarded as examples only, and the true scope and spirit of this application are indicated by the claims.

It should be understood that this application is not limited to the precise structure described above and shown in the drawings, and various modifications and changes can be made without departing from its scope. The scope of this application is limited only by the appended claims.

The invention claimed is:

1. A method for storing and forwarding content applied to a programmable switch, comprising:
  receiving an interest packet in a named data network, wherein the interest packet contains a hash value of a name identifier;
  forwarding the interest packet to a storage node, so that the storage node looks up content corresponding to the name identifier according to the hash value of the name identifier in the interest packet, and encapsulates the content corresponding to the name identifier into a data packet, wherein the data packet contains the hash value of the name identifier and the content corresponding to the name identifier;
  receiving the data packet forwarded by the storage node;
  forwarding the data packet to an interest packet port, wherein the interest packet port is configured to be a port that has once received the name identifier corresponding to the content in the data packet; and
  forwarding another data packet from other programmable switches to the storage node, so that the storage node parses a hash value and content of a name identifier in the another data packet, and stores the hash value of the name identifier and the content corresponding to the name identifier in the another data packet.

2. The method according to claim 1, further comprising, upon receiving the interest packet in the named data network:
  determining whether the interest packet has been previously received; and
  if yes, forwarding the interest packet to the storage node; or
  if not, forwarding to other programmable switches to wait for other programmable switches in the network to send a data packet in response to the interest packet.

3. A method for storing and forwarding content applied to a programmable switch, comprising:
  receiving an interest packet forwarded by a programmable switch, wherein the interest packet is from a named data network and contains a hash value of a name identifier;
  looking up content corresponding to the name identifier according to the hash value of the name identifier in the interest packet;
  encapsulating the content corresponding to the name identifier into a data packet and forwarding the data packet to the programmable switch, so that the programmable switch forwards the data packet to an interest packet port, wherein the data packet contains the hash value of the name identifier and the content corresponding to the name identifier, and the interest packet port is configured to be a port that has once received the name identifier corresponding to the content in the data packet;

receiving another data packet forwarded by the programmable switch from other programmable switches;

parsing a hash value and content of a name identifier in the another data packet; and storing the hash value of the name identifier and the content corresponding to the name identifier in the another data packet.

4. The method according to claim 3, wherein said storing the hash value and the content of the name identifier comprises:

calculating a number of segments to be divided for storing the content according to a segment size preset by the storage node;

dividing the content in turn according to the number of segments to form each segment of content to be stored;

calculating a hash value of the each segment of the content to be stored by using a preset hash function;

determining whether the hash value of the each segment of content collides with stored hash value of each segment of content, and if a hash collision occurs, recalculating the hash value of the each segment of content by using a candidate hash function to until no collision occurs; and storing the content in segments, recording the hash value of the name identifier, the number of content segments, a current segment number, a hash value of content of the current segment and a data segments corresponding to the content, respectively, so as to complete storing the content.

5. An electronic apparatus comprising:

one or more processors;

a memory for storing one or more programs;

wherein when the one or more programs are executed by the one or more processors, the one or more processors implements the method for storing and forwarding content according to claim 1.

6. A non-transitory computer-readable storage medium on which a computer instruction is stored, wherein the instruction, when executed by a processor, implements the method for storing and forwarding content according to claim 1.

* * * * *